United States Patent
Sato et al.

(10) Patent No.: US 6,905,783 B2
(45) Date of Patent: *Jun. 14, 2005

(54) STEEL SHEET FOR PORCELAIN ENAMELING AND METHOD FOR PRODUCTION THEREOF, AND ENAMELED PRODUCT AND METHOD FOR PRODUCTION THEREOF

(75) Inventors: Fumiaki Sato, Osaka (JP); Toshihira Hamada, Osaka (JP); Shuzo Oda, Osaka (JP); Yoshihiro Jono, Osaka (JP); Takahiro Hayashida, Yamaguchi-ken (JP); Junichi Fujimoto, Yamaguchi-ken (JP); Masao Komai, Yamaguchi-ken (JP)

(73) Assignees: Ferro Enamels (Japan) Limited, Osaka (JP); Toyo Kohan Co., Ltd., Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 10/204,358

(22) PCT Filed: Dec. 17, 2001

(86) PCT No.: PCT/JP01/11025

§ 371 (c)(1),
(2), (4) Date: Feb. 14, 2003

(87) PCT Pub. No.: WO02/50326

PCT Pub. Date: Jun. 27, 2002

(65) Prior Publication Data

US 2003/0173002 A1 Sep. 18, 2003

(30) Foreign Application Priority Data

Dec. 21, 2000 (JP) ........................................ 2000-388101

(51) Int. Cl.⁷ ............................ B32B 15/18; C21D 9/46
(52) U.S. Cl. .................... 428/679; 428/630; 428/631; 428/663; 428/680; 428/682; 428/450; 148/529; 148/530; 148/537; 427/419.6
(58) Field of Search ................................ 428/679, 630, 428/631, 663, 680, 682, 450; 148/529, 530, 537; 427/419.6

(56) References Cited

FOREIGN PATENT DOCUMENTS

| EP | 0 916 624 A1 | * | 5/1999 |
| JP | 47-18725 | * | 9/1972 |
| JP | 56-32399 B2 | * | 7/1981 |
| JP | 58-1170 B2 | * | 1/1983 |
| JP | 6-279864 A | * | 10/1994 |
| JP | 6-279865 A | * | 10/1994 |
| JP | 7-118755 A | * | 5/1995 |

OTHER PUBLICATIONS

Kojima Hirotatsu, "Production of Aluminum Killed Cold Rolled Steel Sheet for Porcelain Enameling," Publication No.: 06–279864, Oct. 4, 1994, On–line JAPIO Abstract of Japanese patent.

Kojima Hirotatsu, "Production of Rolled Steel Sheet for Porcelain Enameling," Publication No.: 06–279865, Oct. 4, 1994, On–line JAPIO Abstract of Japanese patent.

Sayanagi Shiro, "Production of Steel Sheet for Porcelain Enameling Excellent in Deep Drawability," Publication No.: 07–118755, May 9, 1995, On–line JAPIO Abstract of Japanese patent.

* cited by examiner

Primary Examiner—Robert R. Koehler
(74) Attorney, Agent, or Firm—Browdy and Neimark, P.L.L.C.

(57) ABSTRACT

Steel sheet for porcelain enameling having excellent workability yet capable of providing an enamel layer having excellent adhesion with the steel sheet on direct-on enameling once and still free of black specks defects, a method for producing the same, as well as a porcelain enamel product and the method for producing the same are provided, in which low carbon Al-killed steel sheet, high oxygen steel sheet, Ti-added steel sheet, Nb-added steel sheet, Ti—Nb-added steel sheet or B-added steel sheet is used. A steel sheet for porcelain enameling is produced by applying Ni—Mo alloy plating to the low carbon Al-killed steel sheet, high oxygen steel sheet, Ti-added steel sheet, Nb-added steel sheet, Ti—Nb-added steel sheet or B-added steel sheet having specified components and composition ratio, and after performing heat treatment thereto to control the content of Ni, Mo, and Fe that are present on the surface of the steel sheet in a predetermined range, porcelain enamel is applied and fired.

15 Claims, No Drawings

STEEL SHEET FOR PORCELAIN ENAMELING AND METHOD FOR PRODUCTION THEREOF, AND ENAMELED PRODUCT AND METHOD FOR PRODUCTION THEREOF

FIELD OF THE INVENTION

The present invention relates to steel sheet for porcelain enameling, method for producing the same, porcelain enamel products and a method for producing the same. In further detail, the invention relates to steel sheet having excellent adhesion with enamel and a method for producing the same, as well as to an enamel product and a method for producing the same, which uses low carbon Al-killed steel sheet, high-oxygen steel sheet, Ti-added steel sheet, Nb-added steel sheet, Ti—Nb-added steel sheet or B-added steel sheet.

BACKGROUND OF THE INVENTION

Porcelain enamel products are widely used as kitchen and table-top articles, components of heating appliances and components of cooking appliances, combustion equipment, bathtubs, interior and exterior materials of buildings, and the like. Porcelain enamel products are generally produced by firing twice; a ground coat enamel is first provided on the steel sheet and fired, a cover coat enamel is further applied thereon, and fired again. In order to reduce the production cost, however, a production method of direct enameling for only once ("direct-on enameling") comprising providing the cover coat enamel directly on the steel sheet followed by firing is employed. However, in the production method of direct-on enameling, it is necessary to perform pretreatment on the steel sheet before enameling, such as intense pickling and Ni dipping treatment. Further, as a steel sheet for obtaining favorable adhesion of the enamel products with the steel sheet in a direct-on enameling, a rolled sheet of high oxygen steel containing oxygen at a high concentration, which is produced by reducing C content in the steel-making stage and produced by continuous casting without performing deoxidation treatment, is widely utilized. However, a high oxygen steel generally suffers poor workability, and its application to usages requiring severe processing is limited.

As a means for improving the adhesion with the enamel in case of applying once, in Japanese Patent Publication No. 24413/1979 is proposed to perform, instead of the surface treatment of the conventionally employed nickel dipping method that is generally performed before enamel applying, covering the surface of the steel material made of the conventional carbon steel sheet with an alloy of one or two types of metals selected from Ni and Fe with one or two types of metals selected from Mo and W. However, there is no description on its workability.

On the other hand, in usages requiring severe workability such as kitchen wares or bathtubs, rolled sheets of Ti-added steel or B-added steel have been used. However, as is disclosed in Japanese Patent Laid-Open No. 140286/1998, although Ti-added steel or B-added steel is superior in workability, black specks defects generate in the enamel layer in case direct-on enameling is performed. Accordingly, the enamel layer had to be formed by means of ground coat enamel finishing or by applying the cover coat and ground coat enameling in two times.

As described above, there is required a steel sheet for porcelain enameling available by reduced production steps and energy consumption, thereby reduced in production cost, yet improved in workability and having an enamel layer with high adhesion even in case the cover coat enamel is applied only once.

The present invention has been made in the light of the circumstances described above, and the objects thereof are to provide steel sheet for porcelain enameling having excellent workability yet capable of providing an enamel layer having excellent adhesion with the steel sheet by applying direct-on enameling of cover coat enamel only once and still free of black specks defects, to provide the method for producing the same, as well as to provide a porcelain enamel product and the method for producing the same, in which low carbon Al-killed steel sheet, high oxygen steel sheet, Ti-added steel sheet, Nb-added steel sheet, Ti—Nb-added steel sheet or B-added steel sheet is used.

SUMMARY OF THE INVENTION

In due course of the studies for solving the problems above, the present inventors have found that, by newly developing the composition ratio of the enamel layer and the surface treatment method, an enamel layer free of black specks defects and having excellent workability and adhesion with the steel sheet can be obtained by the direct-on enameling even on a Ti-added steel or B-added steel, which conventionally required firing twice on forming the enamel layer. The present invention has been accomplished based on these findings.

More specifically, according to the present invention for solving the problems above, there is provided a steel sheet for porcelain enameling comprising an Al killed steel sheet containing 0.10% by weight or less (wherein, % represents "% by weight" hereinafter) of C, 1.0% or less of Mn, 0.15% or less of P, 0.1% or less of S, 0.1% or less of Al, and balance Fe accompanied by unavoidable impurities, having provided thereon a Ni—Mo alloy plating film, and which is then subjected to heat treatment.

The steel sheet for porcelain enameling according to another embodiment comprises a high oxygen steel sheet containing 0.10% by weight or less of C, 1.0% or less of Mn, 0.15% or less of P, 0.1% or less of S, 0.1% or less of Al, 0.001 to 0.10% of O, and balance Fe accompanied by unavoidable impurities, having provided thereon a Ni—Mo alloy plating film, and which is then subjected to heat treatment.

The steel sheet for porcelain enameling according to a third embodiment of the invention comprises a Ti-added steel sheet containing 0.10% by weight or less of C, 1.0% or less of Mn, 0.15% or less of P, 0.1% or less of S, 0.1% or less of Al, 0.03 to 0.50% of Ti, and balance Fe accompanied by unavoidable impurities, having provided thereon a Ni—Mo alloy plating film, and which is then subjected to heat treatment.

The steel sheet for porcelain enameling according to a fourth embodiment comprises a Ti—Nb-added steel sheet containing 0.10% by weight or less of C, 1.0% or less of Mn, 0.15% or less of P, 0.1% or less of S, 0.1% or less of Al, 0.03 to 0.50% of Nb, and balance Fe accompanied by unavoidable impurities, having provided thereon a Ni—Mo alloy plating film, and which is then subjected to heat treatment.

The steel sheet for porcelain enameling according to a fifth embodiment comprises a Nb-added steel sheet containing 0.10% by weight or less of C, 1.0% or less of Mn, 0.15% or less of P, 0.1% or less of S, 0.1% or less of Al, 0.01 to 0.40% of Ti and 0.01 to 0.40% of Nb, provided that Ti and Nb in total not exceeding the range of from 0.03 to 0.50%, and balance Fe accompanied by unavoidable impurities, having provided thereon a Ni—Mo alloy plating film, and which is then subjected to heat treatment.

The steel sheet for porcelain enameling according to a sixth embodiment comprises a B-added steel sheet containing 0.10% by weight or less of C, 1.0% or less of Mn, 0.15% or less of P, 0.1% or less of S, 0.1% or less of Al, 0.001 to 0.020% of B, and balance Fe accompanied by unavoidable impurities, having provided thereon a Ni—Mo alloy plating film, and which is then subjected to heat treatment.

The steel sheet for porcelain enameling according to a seventh embodiment is a steel sheet for porcelain enameling as described above, wherein the content of The elements present on the surface of the steel sheet within a depth of 100 nm from the surface as measured by ESCA (X-ray photoelectron spectroscopy) is characterized as such that the content of Ni is in a range of from 5 to 50%, Mo is in a range of from 5 to 50%, and Fe is in a range of from 30 to 90%, provided that the total of Ni, Mo, and Fe is 100%.

The method for producing a steel sheet for porcelain enameling according to the present invention comprises providing a Ni—Mo alloy plating on each of the Al-killed steel sheet, high oxygen steel sheet, Ti-added steel sheet, Nb-added steel sheet, a Ti—Nb-added steel sheet, or B-added steel sheet, followed by applying a heat treatment thereto. As said Ni—Mo alloy plating, it is preferred that plating is provided in such a manner that the plated film contains Ni at a coverage of 1.5 to 20.0 g/m$^2$ and Mo at a coverage of 0.4 to 7.0 g/m$^2$. Further, said heat treatment is performed in a temperature range of from 500 to 900°C.

Furthermore, the enamel product comprising an enamel layer according to the present invention comprises providing an enamel layer on each of said steel sheets for porcelain enameling. Then, the method for producing an enamel product according to the present invention comprises applying direct-on an overcoat enamel on each of the steel sheets for porcelain enameling above, followed by applying a heat treatment thereto.

The reason for confining each of the components in the Al-killed steel sheet, high oxygen steel sheet, Ti-added steel sheet, Nb-added steel sheet, Ti—Nb-added steel, or B-added steel sheet above according to the present invention is as follows.

[C]
From the viewpoint of suppressing the generation of pores and black specks on firing the enamel while assuring favorable workability, the content of C is set to 0.10% or less. To further improve the workability in particular, the content of C is preferably set to 0.010% or less.

[Mn]
Manganese bonds with S to exhibit effects of suppressing cracking attributed to embrittlement occurring during hot working and of assuring the adhesion of enamel; hence, Mn should be incorporated at a concentration of 1.0% or lower. If the content of Mn should exceed 1.0%, it hardens the material which results in an impaired ductility and press moldability.

[P]
Although P strengthens steel, its addition in excess degrades deep drawability. Hence, the content of P is set to 0.15% or lower.

[S]
Sulfur accelerates surface roughening of the steel sheet on pickling so as to improve the adhesion of the enamel by anchoring effect. However, S contained in excess causes formation of pores and black specks. Hence, the content of S is constrained to 0.1% or lower.

[Al]
Aluminum is added as a deoxidizer, but the addition in excess only increases the cost. Hence, Al is added at an amount of 0.1% or less.

[O]
Oxygen is effective for improving the resistance against cracking and fish scales, however, the addition in excess increases blow holes of the continuously cast slab as to impair the product yield. Hence, in case of using high oxygen steel sheet, the addition of O is constrained in a range of from 0.01 to 0.10%.

[Ti]
Titanium is effective for improving deep drawing properties and for suppressing the generation of cracking and fish scale, and its addition of 0.03% or higher is necessary. However, the addition of Ti in excess brings about the generation of surface defects and increase of production cost. Thus, in case of using in a Ti-added steel sheet, the addition of Ti is limited to a range of from 0.03 to 0.50%.

[Nb]
Similar to Ti, Nb has an effect on improving deep drawing properties and on suppressing the generation of cracking and fish scales, and its addition of 0.03% or higher is necessary. However, the addition of Nb in excess brings about the generation of surface defects and increase of production cost. Thus, similar to Ti, in case of using in a Nb-added steel sheet, the addition of Ti is limited to a range of from 0.03 to 0.50%.

Furthermore, Ti may be used together with Nb, and in such a case, preferably, the addition of Ti is in a range of from 0.01 to 0.40% and the addition of Nb is in a range of from 0.01 to 0.40%, provided that Ti and Nb in total is not lower than 0.03% but not exceeding 0.50%.

[B]
Boron is effective for improving resistance against cracking and fish scales, and its addition of 0.001% or higher is necessary. However, the excessive addition thereof results in an unstable slab properties; hence, in case of using in a B-added steel sheet, the addition of B is set in a range of from 0.001 to 0.020%.

BEST MODE FOR CARRYING OUT THE INVENTION

In the present invention, by applying Ni—Mo alloy plating on each of the steel sheets of a low carbon Al-killed steel sheet, high-oxygen steel sheet, Ti-added steel sheet, Nb-added steel sheet, Ti—Nb-added steel sheet and B-added steel sheet, whose composition is controlled as such described below, and by applying heat treatment thereto in order to control the content of Ni, Mo, and Fe present in the surface of the steel sheet for porcelain enameling in a predetermined range, it has been found that excellent enamel adhesion properties are obtained even on enameled products having the enamel provided by direct-on enameling.

In the present invention, the low-carbon Al-killed steel sheet contains 0.10% by weight or less (wherein, % represents "% by weight" hereinafter) of C, 1.0% or less of Mn, 0.15% or less of P, 0.1% or less of S, 0.1% or less of Al, and balance Fe accompanied by unavoidable impurities. The high-oxygen steel sheet contains further added to the components above, O at a content in a range of from 0.001 to 0.10%; the Ti-added steel sheet contains further added to the components above, Ti in a range of from 0.03 to 0.50%; the Nb-added steel sheet contains further added to the components above, Nb in a range of from 0.03 to 0.50%; the Ti—Nb-added steel sheet contains further added to the components above, Ti in a range of from 0.01 to 0.40% and Nb in a range of from 0.01 to 0.40%, provided that Ti and Nb in total do not exceed a range of from 0.03 to 0.50%; and the B-added steel sheet contains further added to the components above, B in a range of from 0.001 to 0.020%.

A slab is then produced from the steel having its composition adjusted to the range above by means of continuous casting. The resulting slab is then hot rolled, or, hot rolled after re-heating. Then, after descaling by a known method such as sulfuric acid pickling and the like, the resulting product is cold rolled at a reduction of about 50 to 95%, annealed at a temperature of recrystallization temperature or higher but lower than the $Ac_3$ point by means of core box annealing or by continuous annealing process, and subjected to refining rolling at a reduction of about 0.1 to 5% to obtain the steel sheet for use in the present invention.

Subsequently, a Ni—Mo alloy plating is provided to the resulting steel sheet. The alloy plating may be performed by either means of electroless plating or electrolytic plating, but from the ease of control, preferred is electrolytic plating. As the plating bath, there is used an aqueous solution having supplied thereto Ni ions in the form of a salt of an inorganic acid, such as a sulfate, a nitrate, a halide, etc. and Mo ions in the form of an ammonium salt of a metallic acid salt and the like, having further added thereto, as a complexing agent, an organic acid such as citric acid, tartaric acid, or a malic acid or a salt thereof. Then, after adding an acid or an alkali to the resulting aqueous solution to control the pH in a range of from 2 to 4, and adjusting the bath temperature in a range of from 30 to 50° C., direct current electrolysis is performed at a current density of from 5 to 30 $A/dm^2$ by using a Ni plate as the anode. Preferably, degreasing treatment and pickling treatment are performed on the steel sheet by an ordinary method just before applying the plating above, because the steel sheet before plating tends to be oxidized with passage of time or be brought into contact with oils and fats.

Concerning the components in the coating formed by alloy plating above, the coating contains 1.5 to 20.0 $g/m^2$, preferably 2.0 to 6.0 $g/m^2$ of Ni, and 0.4 to 7.0 $g/m^2$, preferably 1.0 to 2.0 $g/m^2$ of Mo. The content can be obtained by fluorescent X-ray spectroscopy. In case the content of Ni and Mo in the plating should fall outside the range above, favorable adhesion cannot be assured between the enamel and the steel sheet, because the elements Fe, Ni, and Mo in the surface of the steel sheet cannot be pertained in the preferred range on applying heat treatment after plating as described below.

Then, heat treatment is performed after providing the Ni—Mo alloy plating on the steel sheet as described above. The heat treatment is carried out in a manner similar to annealing generally performed on an ordinary steel sheet. As the heat treatment, i.e., as the annealing, there can be used either core box annealing or continuous annealing without any problem. Although depending on the content of Fe, Ni, and Mo pertained on the surface of the steel sheet after heat treatment, the conditions of annealing are, heating in the temperature range of from 500 to 900° C. for a time duration of from 1 minute to 15 hours under a reducing atmosphere of a gaseous decomposed ammonia or gaseous HNX, more preferably, heating in the temperature range of from 550 to 750° C. for a time duration of from 1 minute to 8 hours is performed.

In the manner described above, steel sheet for porcelain enameling according to the present invention can be obtained. By the heat treatment described above, Ni and Mo diffuse into the steel sheet, and Ni and Mo undergo mutual diffusion as to change the content of Fe, Ni, and Mo present in the surface of the steel sheet. The content of the elements present in the surface of the steel sheet can be measured by using a surface analyzer of, for instance, ESCA. After the heat treatment, the content of Fe, Ni, and Mo present in the surface of the steel sheet to a depth of 100 nm from the surface is, 5 to 50% Ni, 5 to 50% Mo, and 30 to 90% Fe; preferably, 5 to 30% Ni, 5 to 30% Mo, and 40 to 70% Fe; further, by adjusting the content of Ni, Mo, and Fe in such a manner that the total thereof should become 100%, an excellent adhesion properties of enamel with the steel sheet can be obtained. The "depth" as referred herein is expressed by the depth obtained on the standard sample $SiO_2$ by etching for the same time duration as that employed in Ar-ion etching the surface of the steel sheet after heat treatment. By thus performing heat treatment after applying Ni—Mo alloy plating, a Mo—Ni layer containing Fe at a certain concentration or higher is formed on the surface of the plated steel sheet, and thereby a favorable enamel adhesion can be assured. In case the content of Fe, Ni, and Mo should fall outside the range above, a favorable enamel adhesion becomes unfeasible.

The steel sheet for porcelain enameling thus obtained as described above can be enameled as it is in the state of flat plate without processing, or may be enameled after shaping and processing it into the desired shape by applying bending and drawing. Furthermore, by using the steel sheet for porcelain enameling according to the present invention, a porcelain enameled product with excellent enamel adhesion can be obtained while omitting pickling and nickel treatment process steps. In particular, in case of steel sheet for porcelain enameling for use in a porcelain enameled product in which porcelain enamel is applied by direct-on process, it is necessary to etch iron for an amount of 30 to 40 $g/m^2$ in the pickling step of the pretreatment, and to deposit nickel at a coverage of 0.6 to 1.5 g/m² on the surface thereof. All of these process steps can be excluded in the case of using the steel sheet for porcelain enameling according to the present invention. Furthermore, the porcelain enameled products can be obtained by direct-on enamel finishing of the cover coat porcelain enamel, ground coat enamel finishing, ground coat and cover coat enamel finishing, decorating enamel finishing, etc., and the steel sheet for porcelain enameling according to the present invention is applicable to all of these porcelain enameled products.

EXAMPLES

The present invention is described in further detail by way of examples below.

[Production of steel sheet for porcelain enameling]

Steels (A1 to F3) having the composition as shown in Table 1 were each molten, and 22 types of slabs were produced. The slabs were each heated to 1160° C., and were each hot rolled at a finish temperature of 880° C. to obtain each of the hot rolled sheets 2.8 mm in thickness, which were each taken up into a coil at 650° C. Then, while recoiling, descaling and sulfuric acid pickling were applied to the sheet, and after applying cold rolling thereto to obtain a steel sheet 0.8 mm in thickness, continuous annealing at 830° C. was applied for 75 seconds, and refining rolling at a reduction of 0.5% was performed thereon to obtain a cold rolled steel sheet.

After performing alkali degreasing to the cold rolled steel sheet by an ordinary means and by applying pickling thereto by using an aqueous sulfuric acid solution, electric plating of a Ni—Mo alloy was applied under the conditions below by using the following plating bath to obtain coverage as shown in Table 2. Then, by applying heat treatment under the condition shown in Table 2 in gaseous decomposed ammonia, each of the steel sheets for porcelain enameling shown as Examples 1 to 23 in Table 2 was produced. The content of the elements Fe, Ni, and Mo present in the surface of the steel sheet for porcelain enameling was measured by using ESCA.

| <Plating bath> | |
| --- | --- |
| Nickel sulfate | 82 g/L |
| Ammonium molybdate | 48 g/L |
| Sodium citrate | 88 g/L |
| <Plating condition> | |
| pH | 3.0 |
| Bath temperature | 40° C. |
| Current density | 20 A/dm² |
| Anode | Nickel plate |

TABLE 1

Chemical composition of steel for porcelain enameling

| No. of Steel | Chemical composition of steel (% by weight) | | | | | | | | | Fe and unavoidable impurities |
| --- | --- | --- | --- | --- | --- | --- | --- | --- | --- | --- |
| | C | Mn | P | S | Al | O | Ti | Nb | B | |
| A1 | 0.0011 | 0.16 | 0.008 | 0.004 | 0.064 | — | — | — | — | balance |
| A2 | 0.0049 | 0.25 | 0.017 | 0.005 | 0.002 | — | — | — | — | balance |
| A3 | 0.0100 | 0.36 | 0.011 | 0.030 | 0.070 | — | — | — | — | balance |
| A4 | 0.0072 | 1.00 | 0.013 | 0.015 | 0.030 | — | — | — | — | balance |
| A5 | 0.0067 | 0.29 | 0.150 | 0.015 | 0.030 | — | — | — | — | balance |
| A6 | 0.0046 | 1.00 | 0.019 | 0.100 | 0.030 | — | — | — | — | balance |
| A7 | 0.0023 | 0.29 | 0.013 | 0.022 | 0.100 | — | — | — | — | balance |
| B1 | 0.0031 | 0.30 | 0.013 | 0.008 | 0.010 | 0.001 | — | — | — | balance |
| B2 | 0.0027 | 0.28 | 0.019 | 0.014 | 0.005 | 0.034 | — | — | — | balance |
| B3 | 0.0026 | 0.33 | 0.012 | 0.012 | 0.008 | 0.100 | — | — | — | balance |
| C1 | 0.0029 | 0.19 | 0.018 | 0.022 | 0.038 | — | 0.030 | — | — | balance |
| C2 | 0.0024 | 0.12 | 0.025 | 0.033 | 0.030 | — | 0.079 | — | — | balance |
| C3 | 0.0031 | 0.23 | 0.022 | 0.030 | 0.027 | — | 0.500 | — | — | balance |
| D1 | 0.0045 | 0.20 | 0.022 | 0.032 | 0.038 | — | — | 0.030 | — | balance |
| D2 | 0.0029 | 0.14 | 0.025 | 0.026 | 0.051 | — | — | 0.068 | — | balance |
| D3 | 0.0032 | 0.19 | 0.019 | 0.029 | 0.023 | — | — | 0.500 | — | balance |
| E1 | 0.0052 | 0.10 | 0.029 | 0.039 | 0.042 | — | 0.010 | 0.240 | — | balance |
| E2 | 0.0037 | 0.18 | 0.018 | 0.024 | 0.036 | — | 0.216 | 0.193 | — | balance |
| E3 | 0.0044 | 0.12 | 0.020 | 0.033 | 0.043 | — | 0.332 | 0.010 | — | balance |
| F1 | 0.0062 | 0.24 | 0.019 | 0.008 | 0.084 | — | — | — | 0.001 | balance |
| F2 | 0.0038 | 0.29 | 0.011 | 0.017 | 0.099 | — | — | — | 0.0097 | balance |
| F3 | 0.0042 | 0.19 | 0.016 | 0.011 | 0.054 | — | — | — | 0.020 | balance |

TABLE 2

Steel sheets for porcelain enameling

| Examples and Comparative Examples | No. of Steel | Coverage of plating | | Heat treatment conditions | | Content of elements on steel surface (% by weight) | | |
|---|---|---|---|---|---|---|---|---|
| | | Ni (g/m²) | Mo (g/m²) | Temperature (° C.) | Time | Fe | Ni | Mo |
| Example 1 | A1 | 1.5 | 0.6 | 900 | 1 minute | 55.8 | 35.1 | 9.1 |
| Example 2 | A2 | 4.5 | 1.1 | 630 | 8 hours | 37.4 | 44.5 | 18.1 |
| Example 3 | A3 | 6.0 | 2.0 | 750 | 3 hours | 77.0 | 7.7 | 15.3 |
| Example 4 | A4 | 20.0 | 4.8 | 700 | 5 hours | 43.1 | 40.2 | 16.7 |
| Example 5 | A5 | 1.5 | 6.8 | 750 | 3 hours | 45.1 | 5.1 | 49.8 |
| Example 6 | A6 | 4.6 | 1.2 | 550 | 8 hours | 34.3 | 45.1 | 20.6 |
| Example 7 | A7 | 1.5 | 0.4 | 750 | 1 minute | 88.9 | 5.6 | 5.5 |
| Example 8 | B1 | 3.3 | 1.2 | 750 | 10 hours | 88.8 | 5.6 | 5.6 |
| Example 9 | B2 | 2.5 | 1.2 | 600 | 10 hours | 32.8 | 19.9 | 47.3 |
| Example 10 | B3 | 3.5 | 1.3 | 700 | 5 hours | 31.4 | 33.8 | 24.8 |
| Example 11 | C1 | 4.8 | 1.4 | 750 | 1 hour | 55.5 | 25.5 | 19.0 |
| Example 12 | C2 | 5.7 | 1.6 | 600 | 8 hours | 33.4 | 40.5 | 26.1 |
| Example 13 | C3 | 4.3 | 1.2 | 620 | 8 hours | 33.6 | 47.2 | 19.2 |
| Example 14 | D1 | 2.0 | 0.4 | 900 | 1 minute | 53.8 | 37.3 | 7.9 |
| Example 15 | D2 | 6.0 | 1.8 | 500 | 15 hours | 30.5 | 48.8 | 20.7 |
| Example 16 | D3 | 5.4 | 3.1 | 750 | 2 hours | 64.1 | 10.4 | 25.5 |
| Example 17 | E1 | 15.6 | 7.0 | 700 | 5 hours | 47.1 | 28.2 | 24.7 |
| Example 18 | E2 | 2.5 | 0.8 | 650 | 5 hours | 38.4 | 47.3 | 14.3 |
| Example 19 | E3 | 4.4 | 1.2 | 650 | 6 hours | 35.6 | 47.6 | 16.8 |
| Example 20 | F1 | 4.6 | 1.3 | 640 | 7 hours | 35.2 | 47.0 | 17.8 |
| Example 21 | F2 | 5.9 | 1.8 | 740 | 3 hours | 72.1 | 11.5 | 16.4 |
| Example 22 | F3 | 4.2 | 1.5 | 620 | 9 hours | 36.6 | 48.1 | 15.3 |
| Example 23 | A2 | 3.7 | 1.4 | 650 | 5 hours | 37.5 | 35.5 | 27.0 |
| Comp. Ex. 1 | E2 | 3.1 | — | 550 | 5 hours | 1 | 85.8 | — |
| Comp. Ex. 2 | D3 | 22.5 | 8.8 | 400 | 1 hour | 3.1 | 65.7 | 31.2 |
| Comp. Ex. 3 | B2 | 1.3 | — | 950 | 1 hour | 95.3 | 4.7 | — |

Furthermore, as Comparative Example, steel type No. D3 was electrically plated by using the plating bath above under the plating conditions above in such a manner to result in the coverage shown in Comparative Example 2 shown in Table 2. For steel type Nos. E2 and B2, Ni was electrically plated under the conditions shown below to result in the coverage shown in Comparative Examples 1 and 3 shown in Table 2, and the resulting products were subjected to heat treatment under conditions shown in Table 2 in gaseous decomposed ammonia. Thus were obtained steel sheets for porcelain enameling given as Comparative Examples 1 to 3 in table 2. The content of elements Fe, Ni, and Mo that are present on the surface of the steel sheets for porcelain enameling was measured by using ESCA.

<Plating bath>

| Nickel sulfate | 300 g/L |
| Nickel chloride | 45 g/L |
| Boric acid | 30 g/L |

<Plating condition>

| pH | 4.0 |
| Bath temperature | 55° C. |
| Current density | 10 A/dm² |
| Anode | Nickel plate |

[Evaluation of Properties]

The workability, adhesion of the porcelain enamel provided by direct-on enameling of the cover coat enamel, and the appearance were evaluated on each of the steel sheets for porcelain enameling thus obtained.

<Workability>

The workability of the steel sheets for porcelain enameling was evaluated by working them each into Yamada-type cup (draw ratio: 2.2), and the moldabilty into the cup was evaluated; further, peeling test was performed on the worked portion by using a cellophane tape. The workability was evaluated under evaluation standards as follows. The results are shown in Table 3.

Good: Good cup moldability and peeling test result were obtained

Fair: Good cup moldability was obtained, and peeling off occurred on 5% or less of the tested portion Poor: Good cup moldability was obtained, and peeling off occurred on 5% or more of the tested portion Bad: Cup moldability and peeling test result were both poor After providing cover coat porcelain enamel (No. 02-1103/100, produced by FERRO ENAMELS (JAPAN) LIMITED) to the steel sheets for porcelain enameling above by direct-on enameling in such a manner that the thickness on firing should become about 120 $\mu$m and drying, the resulting product was fired at 800° C. for 3 minutes under the atmosphere in a baking furnace to obtain the samples. The samples were then evaluated in the manner described below on the adhesion of the porcelain enamel and on the appearance.

<Adhesion>

The adhesion of the porcelain enamel was evaluated by PEI method in the following manner.

A steel ball 25 mm in diameter was pressed against the flat sheet portion of the sample and the sample was deformed by applying a force of 8.9 kN using a hydraulic press, and 169 metallic conductive probes were pressed to the deformed portion to apply electric current. The insulation was evaluated in accordance with the following equation.

Insulation(%)=(n/169)×100, where, n represents the number of probes showing no conduction. From the value of insulation (%) thus obtained by the equation above, the adhesion of the enamel was evaluated in accordance with the following evaluation standard.

Good: Insulation>85%
Fair: 80%≦Insulation≦85%
Poor: Insulation<80%

The results are given in Table 3.

<Appearance>

The appearance of the enamel was evaluated by cutting out ten test pieces each 30 cm×30 cm in size from a single sample. The test pieces were each visually observed for the generation of pores, black specks, and cracking and fish scales, and the number of the generated defects was counted. Evaluation was made in accordance with the standard as follows.

Pores and black specks
  Good: No pores and black specks were observed.
  Fair: Less than ten pores or black specks in total were observed on ten test pieces.
  Poor: Ten or more pores or black specks in total were observed on ten test pieces.

Cracking and fish scale
  Good: No cracking and fish scales were observed.
  Fair: Less than ten cracking and fish scales in total were observed on ten test pieces.
  Poor: Ten or more cracking and fish scales in total were observed on ten test pieces.

TABLE 3

Results of Evaluated Properties

| Examples and Comparative Examples | Process-Ability | Adhesion of enamel | Appearance Pores and black specks | Cracking and fish scales |
|---|---|---|---|---|
| Example 1 | Good | Good | Good | Good |
| Example 2 | Good | Good | Good | Good |
| Example 3 | Good | Good | Good | Good |
| Example 4 | Good | Good | Good | Good |
| Example 5 | Good | Good | Good | Good |
| Example 6 | Good | Good | Good | Good |
| Example 7 | Good | Good | Good | Good |
| Example 8 | Good | Good | Good | Good |
| Example 9 | Good | Good | Good | Good |
| Example 10 | Good | Good | Good | Good |
| Example 11 | Good | Good | Good | Good |
| Example 12 | Good | Good | Good | Good |
| Example 13 | Good | Good | Good | Good |
| Example 14 | Good | Good | Good | Good |
| Example 15 | Good | Good | Good | Good |
| Example 16 | Good | Good | Good | Good |
| Example 17 | Good | Good | Good | Good |
| Example 18 | Good | Good | Good | Good |
| Example 19 | Good | Good | Good | Good |
| Example 20 | Good | Good | Good | Good |
| Example 21 | Good | Good | Good | Good |
| Example 22 | Good | Good | Good | Good |
| Comp. Ex. 1 | Good | Good | Poor | Good |
| Comp. Ex. 2 | Bad | Good | Poor | Poor |
| Comp. Ex. 3 | Good | Poor | Good | Poor |
| Comp. Ex. 4 | Poor | Poor | Poor | Poor |

The results are given in Table 3.

As shown in Table 3, the steel sheet for porcelain enameling according to the present invention has excellent workability, and among them, Ti-added steel and B-added steel showed particularly superior properties. Furthermore, enameled products produced by direct-on enameling of cover coat porcelain enamel having excellent enamel adhesion and appearance were obtained for the entire scope of the present invention.

In contrast to above, in Comparative Example 1, good enamel adhesion was obtained, but the cup workability was poor; in Comparative Example 2, on the contrary, the cup workability was good, but the enamel adhesion was poor; and in Comparative Example 3, poor results were obtained on both properties. Concerning enamel appearance, pores and black specks as well as cracking and fish scales were observed on Comparative Examples 1 and 3, and in Comparative Example 2, cracking and fish scales were observed. Hence, the enamel appearance was poor for all of the comparative samples.

[Production of Porcelain Enamel Products]

Porcelain Enamel products were produced in the following manner by using the steel sheet for porcelain enameling according to the present invention.

The steel sheets for porcelain enameling given as Examples 21 and 23 in Table 2 were each pressed into a shape of a saucepan having an inner diameter of 160 mm and a depth of 110 mm, and into a shape of the top plate of an oil stove 220 mm in length, 400 mm in width, and 8 mm in depth. To the base metal for enameling thus obtained, porcelain enamel was applied in 4 methods, and the resulting products were fired to obtain the porcelain enamel products.

<Porcelain Enamel>

Ground coat enamel: 03-1226, produced by FERRO ENAMELS (JAPAN) LIMITED
Cover coat enamel: 02-2105, produced by FERRO ENAMELS (JAPAN) LIMITED <Enameling>

(1) Ground coat enamel finish (Applying ground coat enamel once—firing once)

To the saucepan and the oil stove top plate obtained by press working above as the base metal for enameling, the ground coat enamel 03-1226 was applied to obtain a fired coating about 100 μm in thickness. The resulting product was dried and fired in a firing furnace at 820° C. for 5 minutes.

(2) cover coat enamel finishing on ground coat enamel-finished surface (Applying enamel twice—firing twice)

After applying a ground coat enamel in the same manner as above and firing, the cover coat enamel above, 02-2105, was applied to the surface in such a manner that the fired thickness of about 100 μm would result. The resulting product was dried and fired in a firing furnace at 820° C. for 5 minutes.

(3) Ground coat enamel+Cover coat enamel finishing (Applying enamel twice—firing once)

To the same saucepan and the oil stove top plate as above obtained as the base metal for enameling, the ground coat enamel 03-1226 described above was applied to obtain a fired coating about 80 μm in thickness. Then, without firing, the cover coat enamel described above, 02-2105, was applied in such a manner to obtain a fired coating about 120 μm in thickness. The resulting product was dried and baked in a firing furnace at 820° C. for 5 minutes.

(4) Cover coat enamel finishing (Direct-on applying cover coat enamel—firing once)

To the same saucepan and the oil stove top plate as above obtained as the base metal for enameling, the cover coat enamel described above, 02-2105, was applied in such a manner to obtain a fired coating about 120 μm in thickness. The resulting product was dried and fired in a firing furnace at 820° C. for 5 minutes.

The saucepans and the oil stove top plates obtained as the porcelain enamel products according to (1) to (4) above were subjected to evaluation for adhesion and appearance.

<Adhesion>

Similar to the evaluation performed on the steel sheet for porcelain enameling described hereinbefore, PEI method was used for the evaluation.

<Appearance>

The appearance of the enamel products was visually observed to evaluate the generation of pores, black specks, pinholes, cracking and fish scales, etc. The results are given in Table 4.

As shown in Table 4, similar to the case of applying firing a ground coat enamel and applying a cover coat enamel, or to the case of twice enameling, i.e., to the case of applying a ground coat enamel and then applying a cover coat enamel and firing, the porcelain enamel products according to the present invention, which are obtained by direct-on enameling of a ground coat enamel or a cover coat enamel, exhibit excellent enamel adhesion and appearance.

TABLE 4

| Enameling method | Porcelain enamel product | Appearance | Adhesion |
| --- | --- | --- | --- |
| Ground enamel finishing (Applying ground coat enamel once-firing once) | Saucepan Top plate of oil stove | Good; free from pores, black specks, pinholes, cracking and fish scales, etc. | Good |
| Cover coat enamel finishing on ground coat enamel-finished surface (Applying) enamel twice-firing twice) | Saucepan Top plate of oil stove | | |
| Ground coat enamel + Cover coat enamel finishing (Applying enamel twice – firing once) | Saucepan Top plate of oil stove | | |
| Cover coat enamel finishing (Direct-on applying cover coat enamel – firing once) | Saucepan Top plate of oil stove | | |

Furthermore, the steel sheet for porcelain enameling according to the present invention is applicable, not only as the base metal of enamel products, but also as base metal for forming thereon inorganic or organic coating films.

INDUSTRIAL APPLICABILITY

As described above, the present invention enables a steel sheet for porcelain enameling having excellent workability and enamel adhesion by applying a Ni—Mo alloy plating on low carbon Al-killed steel sheet, high-oxygen steel sheet, Ti-added steel sheet, Nb-added steel sheet, Ti—Nb-added steel sheet or B-added steel sheet, and then performing heat treatment thereto. Furthermore, by controlling the amount of Ni, Mo, and Fe present on the surface of the steel sheet in a predetermined range, and by then providing a cover coat enamel by direct-on enameling and firing, porcelain enamel products having excellent enamel adhesion and appearance well comparable to the enamel products resulting from twice applying the cover coat and ground coat enamel can be obtained.

What is claimed is:

1. A steel sheet for porcelain enameling comprising an Al-killed steel sheet containing 0.10% by weight or less (wherein, % represents "% by weight" hereinafter) of C, 1.0% or less of Mn, 0.15% or less of P, 0.1% or less of S, 0.1% or less of Al, and balance Fe accompanied by unavoidable impurities, having provided thereon a Ni—Mo alloy plating film, and which is then subjected to heat treatment.

2. A steel sheet for porcelain enameling comprising a high oxygen steel sheet containing 0.10% by weight or less of C, 1.0% or less of Mn, 0.15% or less of P, 0.1% or less of S, 0.1% or less of Al, 0.001 to 0.10% of O, and balance Fe accompanied by unavoidable impurities, having provided thereon a Ni—Mo alloy plating film, and which is then subjected to heat treatment.

3. A steel sheet for porcelain enameling comprising a Ti-added steel sheet containing 0.10% by weight or less of C, 1.0% or less of Mn, 0.15% or less of P, 0.1% or less of S, 0.1% or less of Al, 0.03 to 0.50% of Ti, and balance Fe accompanied by unavoidable impurities, having provided thereon a Ni—Mo alloy plating film, and which is then subjected to heat treatment.

4. A steel sheet for porcelain enameling comprising a Nb-added steel sheet containing 0.10% by weight or less of C, 1.0% or less of Mn, 0.15% or less of P, 0.1% or less of S, 0.1% or less of Al, 0.03 to 0.50% of Nb, and balance Fe accompanied by unavoidable impurities, having provided thereon a Ni—Mo alloy plating film, and which is then subjected to heat treatment.

5. A steel sheet for porcelain enameling comprising a Ti—Nb-added steel sheet containing 0.10% by weight or less of C, 1.0% or less of Mn, 0.15% or less of P, 0.1% or less of S, 0.1% or less of Al, 0.01 to 0.40% of Ti and 0.01 to 0.40% of Nb, provided that Ti and Nb in total not exceeding the range of from 0.03 to 0.50%, and balance Fe accompanied by unavoidable impurities, having provided thereon a Ni—Mo alloy plating film, and which is then subjected to heat treatment.

6. A steel sheet for porcelain enameling comprising a B-added steel sheet containing 0.10% by weight or less of C, 1.0% or less of Mn, 0.15% or less of P, 0.1% or less of S, 0.1% or less of Al, 0.001 to 0.020% of B, and balance Fe accompanied by unavoidable impurities, having provided thereon a Ni—Mo alloy plating film, and which is then subjected to heat treatment.

7. A steel sheet for porcelain enameling as claimed in one of claims 1 to 6, wherein the content of the elements present on the surface of the steel sheet within a depth of 100 nm from the surface is characterized as such that the content of Ni is in a range of from 5 to 50%, Mo is in a range of from 5 to 50%, and Fe is in a range of from 30 to 90%, provided that the total of Ni, Mo, and Fe is 100%.

8. A method for producing a steel sheet for porcelain enameling, which is characterized by that it comprises providing a Ni—Mo alloy plating on the Al-killed steel sheet, high oxygen steel sheet, Ti-added steel sheet, Nb-added steel sheet, Ti—Nb-added steel sheet, or B-added steel sheet claimed in one of claims 1 to 6, followed by applying a heat treatment thereto.

9. A method for producing a steel sheet for porcelain enameling as claimed in claim 8, wherein said Ni—Mo alloy plating is characterized by that it is plated as such that the plating film contains Ni at a coverage of 1.5 to 20.0 g/m$^2$ and Mo at a coverage of 0.4 to 7.0 g/m$^2$.

10. A method for producing a steel sheet for porcelain enameling as claimed in claim 8, wherein said heat treatment is performed at a temperature of range from 500 to 900° C.

11. A porcelain enameled product comprising an enamel layer provided on the steel sheet for porcelain enameling as claimed in one of claims 1 to 6.

12. A method for producing a porcelain enameled product, comprising once applying a cover coat enamel on the steel sheet for porcelain enameling as claimed in one of claims 1 to 6, followed by applying a heat treatment thereto.

13. A method for producing a steel sheet for porcelain enameling as claimed in claim 9, wherein said heat treatment is performed at a temperature of range from 500 to 900° C.

14. A porcelain steel sheet product comprising an enamel layer provided on the steel sheet for porcelain enameling as claimed in claim 7.

15. A method for producing a porcelain enameled product, comprising once applying a cover coat enamel onto the steel sheet for porcelain enameling as claimed in claim 7, followed by applying a heat treatment thereto.

\* \* \* \* \*